United States Patent
Zhang et al.

(10) Patent No.: US 12,288,408 B2
(45) Date of Patent: Apr. 29, 2025

(54) SYSTEMS AND METHODS OF IDENTIFYING INDIVIDUAL RETAIL PRODUCTS IN A PRODUCT STORAGE AREA BASED ON AN IMAGE OF THE PRODUCT STORAGE AREA

(71) Applicant: Walmart Apollo, LLC, Bentonville, AR (US)

(72) Inventors: Lingfeng Zhang, Dallas, TX (US); Han Zhang, Allen, TX (US); Abhinav Pachauri, Kanpur (IN); Amit Jhunjhunwala, Bangalore (IN); Ashlin Ghosh, Ernakulam (IN); Avinash Madhusudanrao Jade, Bangalore (IN); Raghava Balusu, Achanta (IN); Srinivas Muktevi, Bengaluru (IN); Mingquan Yuan, Flower Mound, TX (US); Zhaoliang Duan, Frisco, TX (US); Zhiwei Huang, Flower Mound, TX (US); Tianyi Mao, Chicago, IL (US)

(73) Assignee: Walmart Apollo, LLC, Bentonville, AR (US)

( * ) Notice: Subject to any disclaimer, the term of this patent is extended or adjusted under 35 U.S.C. 154(b) by 341 days.

(21) Appl. No.: 17/963,802

(22) Filed: Oct. 11, 2022

(65) Prior Publication Data
US 2024/0119749 A1    Apr. 11, 2024

(51) Int. Cl.
*G06V 30/148*    (2022.01)
*G06Q 10/08*    (2024.01)
*G06V 20/00*    (2022.01)

(52) U.S. Cl.
CPC ......... *G06V 30/153* (2022.01); *G06Q 10/08* (2013.01); *G06V 20/36* (2022.01)

(58) Field of Classification Search
CPC ....... G06V 30/153; G06V 20/36; G06Q 10/08
(Continued)

(56) References Cited

U.S. PATENT DOCUMENTS

| | | |
|---|---|---|
| 5,074,594 A | 12/1991 | Laganowski |
| 6,570,492 B1 | 5/2003 | Peratoner |

(Continued)

FOREIGN PATENT DOCUMENTS

| | | |
|---|---|---|
| CN | 106347550 B | 8/2019 |
| CN | 110348439 B | 10/2019 |

(Continued)

OTHER PUBLICATIONS

U.S. Appl. No. 17/963,751, filed Oct. 11, 2022, Yilun Chen.
(Continued)

*Primary Examiner* — Allen H Nguyen
(74) *Attorney, Agent, or Firm* — Foley IP Law, PLLC

(57) ABSTRACT

Systems and methods of monitoring inventory of a product storage facility include an image capture device configured to move about the product storage areas of the product storage facility and capture images of the product storage areas from various angles. A computing device coupled to the image capture device obtains the images of the product storage areas captured by the image capture device and processes the obtained images of the product storage areas to detect individual products captured in the obtained images. Based on detection of the individual products captured in the images, the computing device analyzes each of the obtained images to extract meta data from the packaging the individual products to detect one more keywords and determine the locations of the detected keywords on the packaging, and then utilize this information to predict an identity of the products associated with the packaging.

20 Claims, 10 Drawing Sheets

(58) Field of Classification Search
USPC .......................................................... 382/177
See application file for complete search history.

(56) References Cited

U.S. PATENT DOCUMENTS

| | | | |
|---|---|---|---|
| 8,923,650 | B2 | 12/2014 | Wexler |
| 8,965,104 | B1 | 2/2015 | Hickman |
| 9,275,308 | B2 | 3/2016 | Szegedy |
| 9,477,955 | B2 | 10/2016 | Goncalves |
| 9,526,127 | B1 | 12/2016 | Taubman |
| 9,576,310 | B2 | 2/2017 | Cancro |
| 9,659,204 | B2 | 5/2017 | Wu |
| 9,811,754 | B2 | 11/2017 | Schwartz |
| 10,002,344 | B2 | 6/2018 | Wu |
| 10,019,803 | B2 | 7/2018 | Venable |
| 10,032,072 | B1 | 7/2018 | Tran |
| 10,127,607 | B2* | 11/2018 | Gupta ............... G06Q 30/0254 |
| 10,129,524 | B2 | 11/2018 | Ng |
| 10,210,432 | B2 | 2/2019 | Pisoni |
| 10,373,116 | B2 | 8/2019 | Medina |
| 10,572,757 | B2 | 2/2020 | Graham |
| 10,592,854 | B2 | 3/2020 | Schwartz |
| 10,839,452 | B1 | 11/2020 | Guo |
| 10,922,574 | B1 | 2/2021 | Tariq |
| 10,943,278 | B2 | 3/2021 | Benkreira |
| 10,956,711 | B2 | 3/2021 | Adato |
| 10,990,950 | B2 | 4/2021 | Garner |
| 10,991,036 | B1 | 4/2021 | Bergstrom |
| 11,036,949 | B2 | 6/2021 | Powell |
| 11,055,905 | B2 | 7/2021 | Tagra |
| 11,087,272 | B2 | 8/2021 | Skaff |
| 11,151,426 | B2 | 10/2021 | Dutta |
| 11,163,805 | B2 | 11/2021 | Arocho |
| 11,276,034 | B2 | 3/2022 | Shah |
| 11,282,287 | B2 | 3/2022 | Gausebeck |
| 11,295,163 | B1 | 4/2022 | Schoner |
| 11,308,775 | B1 | 4/2022 | Sinha |
| 11,409,977 | B1 | 8/2022 | Glaser |
| 11,562,500 | B2* | 1/2023 | Zhang ................... G06Q 50/12 |
| 2005/0238465 | A1 | 10/2005 | Razumov |
| 2011/0040427 | A1 | 2/2011 | Ben-Tzvi |
| 2014/0002239 | A1 | 1/2014 | Rayner |
| 2014/0247116 | A1 | 9/2014 | Davidson |
| 2014/0307938 | A1 | 10/2014 | Doi |
| 2015/0363625 | A1* | 12/2015 | Wu ...................... G06K 7/1447 |
| | | | 382/203 |
| 2015/0363660 | A1 | 12/2015 | Vidal |
| 2016/0203525 | A1 | 7/2016 | Hara |
| 2017/0106738 | A1 | 4/2017 | Gillett |
| 2017/0212910 | A1* | 7/2017 | Morris ...................... G06T 3/40 |
| 2017/0286773 | A1 | 10/2017 | Skaff |
| 2018/0005176 | A1 | 1/2018 | Williams |
| 2018/0018788 | A1 | 1/2018 | Olmstead |
| 2018/0197223 | A1 | 7/2018 | Grossman |
| 2018/0260772 | A1 | 9/2018 | Chaubard |
| 2019/0025849 | A1 | 1/2019 | Dean |
| 2019/0043003 | A1 | 2/2019 | Fisher |
| 2019/0050932 | A1 | 2/2019 | Dey |
| 2019/0087772 | A1 | 3/2019 | Medina |
| 2019/0163698 | A1 | 5/2019 | Kwon |
| 2019/0197561 | A1 | 6/2019 | Adato |
| 2019/0220482 | A1 | 7/2019 | Crosby |
| 2019/0236531 | A1 | 8/2019 | Adato |
| 2020/0246977 | A1 | 8/2020 | Swietojanski |
| 2020/0265494 | A1 | 8/2020 | Glaser |
| 2020/0324976 | A1 | 10/2020 | Diehr |
| 2020/0356813 | A1 | 11/2020 | Sharma |
| 2020/0380226 | A1 | 12/2020 | Rodriguez |
| 2020/0387858 | A1 | 12/2020 | Hasan |
| 2021/0049541 | A1 | 2/2021 | Gong |
| 2021/0049542 | A1 | 2/2021 | Dalal |
| 2021/0142105 | A1 | 5/2021 | Siskind |
| 2021/0150231 | A1 | 5/2021 | Kehl |
| 2021/0192780 | A1 | 6/2021 | Kulkarni |
| 2021/0216954 | A1 | 7/2021 | Chaubard |
| 2021/0272269 | A1 | 9/2021 | Suzuki |
| 2021/0319684 | A1 | 10/2021 | Ma |
| 2021/0342914 | A1 | 11/2021 | Dalal |
| 2021/0400195 | A1 | 12/2021 | Adato |
| 2022/0043547 | A1 | 2/2022 | Jahjah |
| 2022/0051179 | A1 | 2/2022 | Savvides |
| 2022/0058425 | A1 | 2/2022 | Savvides |
| 2022/0067085 | A1 | 3/2022 | Nihas |
| 2022/0114403 | A1 | 4/2022 | Shaw |
| 2022/0114821 | A1 | 4/2022 | Arroyo |
| 2022/0138914 | A1 | 5/2022 | Wang |
| 2022/0165074 | A1 | 5/2022 | Srivastava |
| 2022/0222924 | A1 | 7/2022 | Pan |
| 2022/0262008 | A1 | 8/2022 | Kidd |

FOREIGN PATENT DOCUMENTS

| | | |
|---|---|---|
| CN | 110443298 B | 2/2022 |
| CN | 114898358 A | 8/2022 |
| EP | 3217324 A1 | 9/2017 |
| EP | 3437031 | 2/2019 |
| EP | 3479298 | 5/2019 |
| WO | 2006113281 A2 | 10/2006 |
| WO | 2017201490 A1 | 11/2017 |
| WO | 2018093796 | 5/2018 |
| WO | 2020051213 A1 | 3/2020 |
| WO | 2021186176 A1 | 9/2021 |
| WO | 2021247420 A2 | 12/2021 |

OTHER PUBLICATIONS

U.S. Appl. No. 17/963,787, filed Oct. 11, 2022, Lingfeng Zhang.
U.S. Appl. No. 17/963,903, filed Oct. 11, 2022, Raghava Balusu.
U.S. Appl. No. 17/966,580, filed Oct. 14, 2022, Paarvendhan Puviyarasu.
U.S. Appl. No. 17/971,350, filed Oct. 21, 2022, Jing Wang.
U.S. Appl. No. 17/983,773, filed Nov. 9, 2022, Lingfeng Zhang.
Chaudhuri, Abon et al.; "A Smart System for Selection of Optimal Product Images in E-Commerce"; 2018 IEEE Conference on Big Data (Big Data); Dec. 10-13, 2018; IEEE; <https://ieeexplore.ieee.org/document/8622259>; pp. 1728-1736.
Chenze, Brandon et al.; "Iterative Approach for Novel Entity Recognition of Foods in Social Media Messages"; 2022 IEEE 23rd International Conference on Information Reuse and Integration for Data Science (IRI); Aug. 9-11, 2022; IEEE; <https://ieeexplore.ieee.org/document/9874231>; pp. 126-131.
Naver Engineering Team; "Auto-classification of NAVER Shopping Product Categories using TensorFlow"; <https://blog.tensorflow.org/2019/05/auto-classification-of-naver-shopping.html>; May 20, 2019; pp. 1-13.
Paolanti, Marine et al.; "Mobile robot for retail surveying and inventory using visual and textual analysis of monocular pictures based on deep learning"; European Conference on Mobile Robots; Sep. 2017, 6 pages.
Ramanpreet Kaur et al.; "A Brief Review on Image Stitching and Panorama Creation Methods"; International Journal of Control Theory and Applications; 2017; vol. 10, No. 28; International Science Press; Gurgaon, India; <https://www.researchgate.net/publication/348232877 >; 11 pages.
Refills; "Final 3D object perception and localization"; European Commision, Dec. 31, 2016, 16 pages.
Retech Labs; "Storx | RetechLabs"; <https://retechlabs.com/storx/>; available at least as early as Jun. 22, 2019; retrieved from Internet Archive Wayback Machine <https://web.archive.org/web/20190622012152/https://retechlabs.com/storx/> on Dec. 1, 2022; pp. 1-4.
Schroff, Florian et al.; "Facenet: a unified embedding for face recognition and clustering"; 2015 IEEE Conference on Computer Vision and Pattern Recognition (CVPR); Jun. 7-12, 2015; IEEE; <https://ieeexplore.ieee.org/document/7298682>; pp. 815-823.
Singh, Ankit; "Automated Retail Shelf Monitoring Using AI"; <https://blog.paralleldots.com/shelf-monitoring/automated-retail-shelf-monitoring-using-ai/>; Sep. 20, 2019; pp. 1-12.

(56) References Cited

OTHER PUBLICATIONS

Singh, Ankit; "Image Recognition and Object Detection in Retail"; <https://blog.paralleldots.com/featured/image-recognition-and-object-detection-in-retail/>; Sep. 26, 2019; pp. 1-11.

Tan, Mingxing et al.; "EfficientDet: Scalable and Efficient Object Detection"; 2020 IEEE/CVF Conference on Computer Vision and Pattern Recognition (CVPR); Jun. 13-19, 2020; IEEE; <https://ieeexplore.ieee.org/document/9156454>; pp. 10778-10787.

Tan, Mingxing et al.; "EfficientNet: Rethinking Model Scaling for Convolutional Neural Networks"; Proceedings of the 36th International Conference on Machine Learning; 2019; vol. 97; PLMR; <http://proceedings.mlr.press/v97/tan19a.html>; pp. 6105-6114.

Technology Robotix Society; "Colour Detection"; <https://medium.com/image-processing-in-robotics/colour-detection-e15bc03b3f61>; Jul. 2, 2019; pp. 1-8.

Tonioni, Alessio et al.; "A deep learning pipeline for product recognition on store shelves"; 2018 IEEE International Conference on Image Processing, Applications and Systems (IPAS); Dec. 12-14, 2018; IEEE; <https://ieeexplore.ieee.org/document/8708890>; pp. 25-31.

Trax Retail; "Image Recognition Technology for Retail | Trax"; <https://traxretail.com/retail/>; available at least as early as Apr. 20, 2021; retrieved from Internet Wayback Machine <https://web.archive.org/web/20210420132348/https://traxretail.com/retail/> on Dec. 1, 2022; pp. 1-19.

Verma, Nishchal et al.; "Object identification for inventory management using convolutional neural network"; IEEE Applied Imagery Pattern Recognition Workshop (AIPR); Oct. 2016, 6 pages.

\* cited by examiner

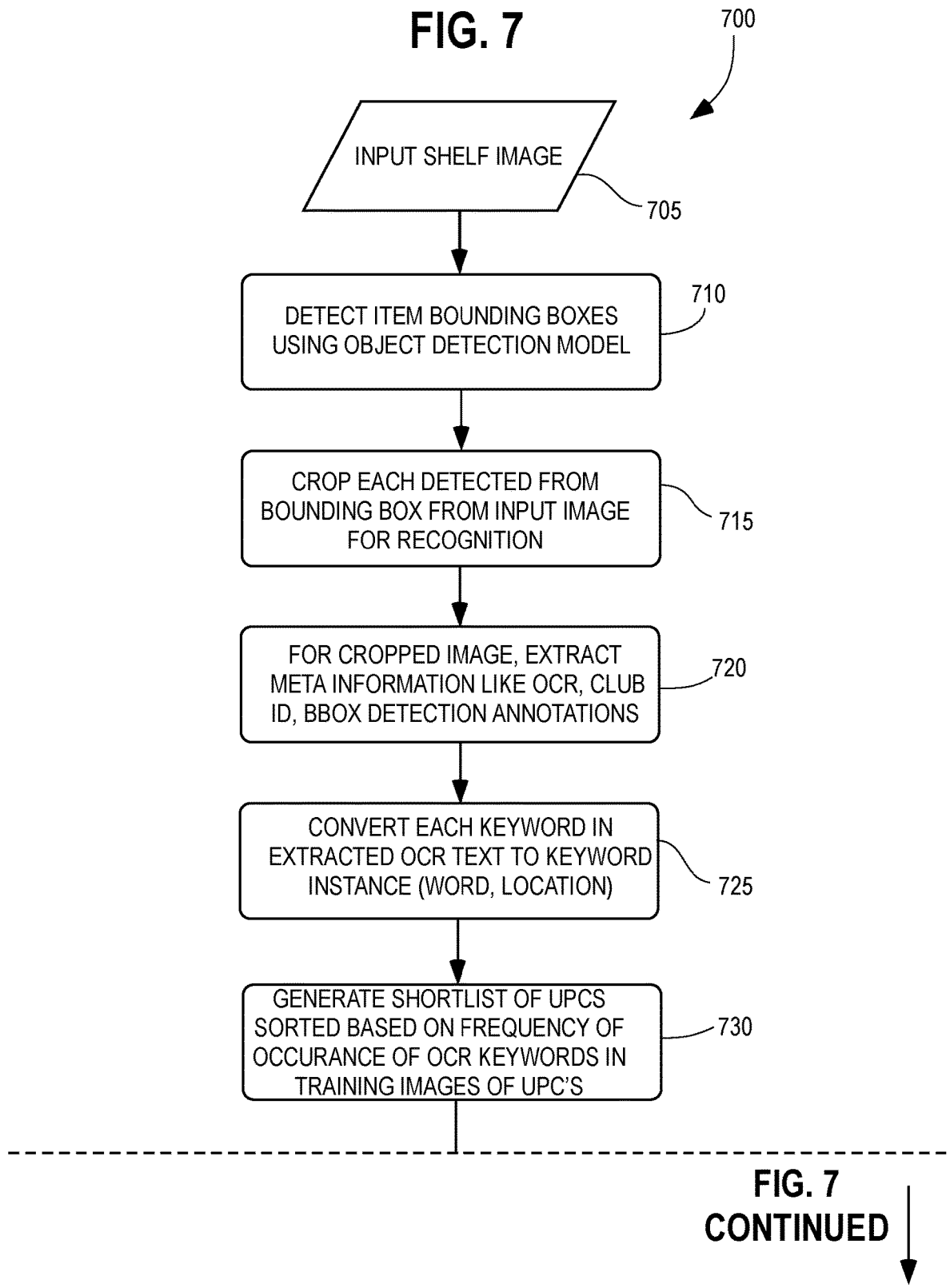

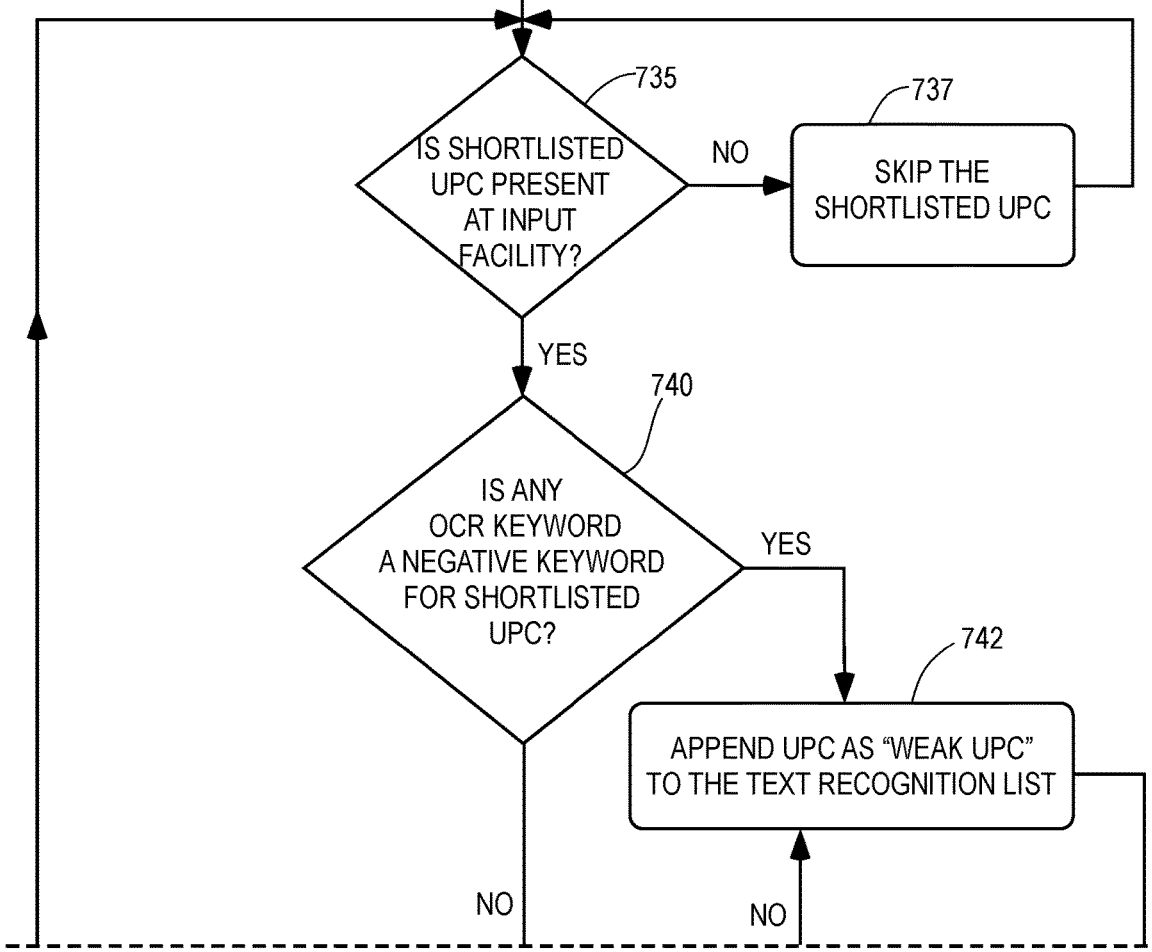

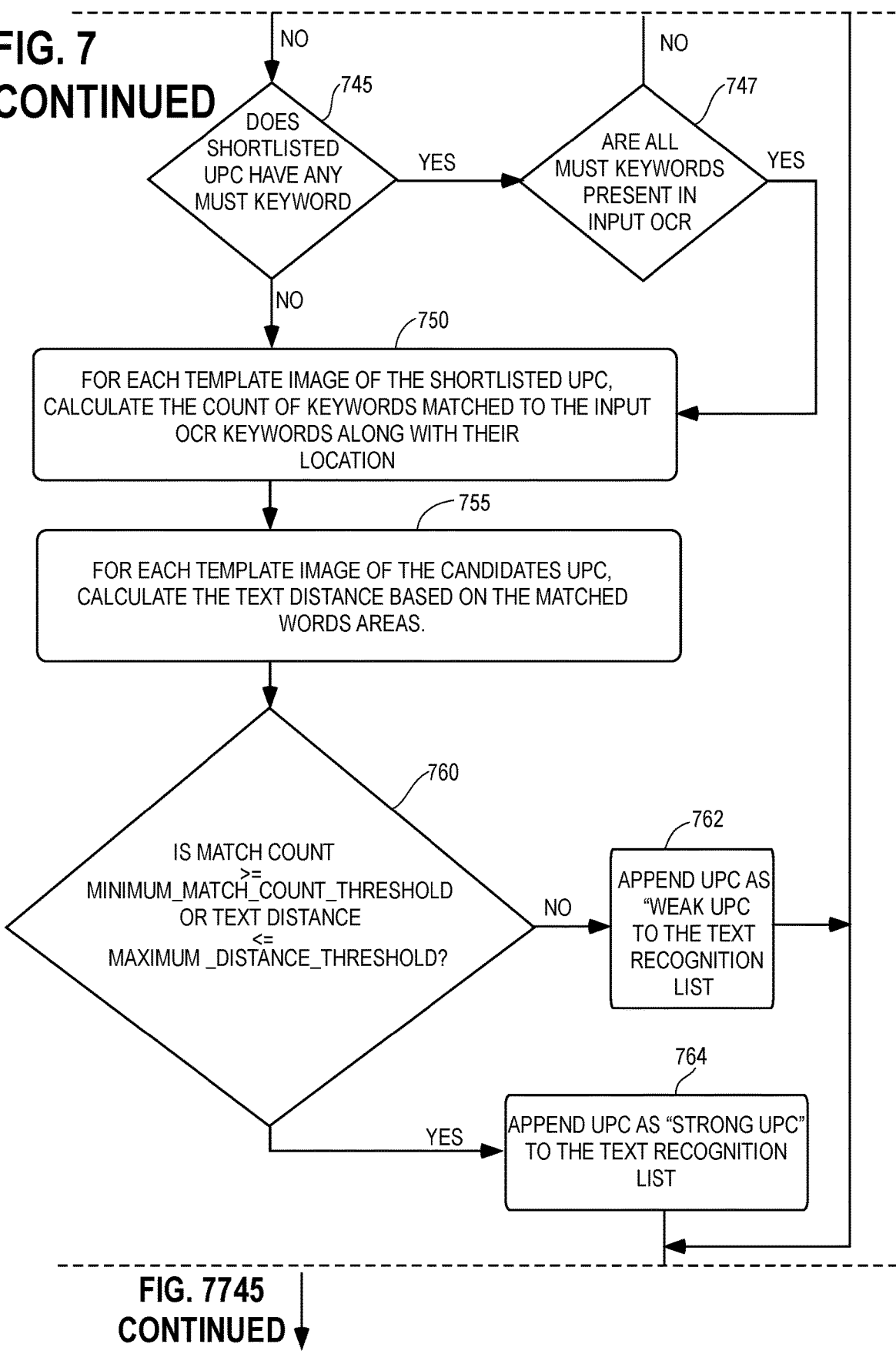

SYSTEMS AND METHODS OF
IDENTIFYING INDIVIDUAL RETAIL
PRODUCTS IN A PRODUCT STORAGE
AREA BASED ON AN IMAGE OF THE
PRODUCT STORAGE AREA

TECHNICAL FIELD

This invention relates generally to managing inventory at product storage facilities, and in particular, to processing digital images of product storage structures at product storage facilities to monitor on-hand inventory at the product storage facilities.

BACKGROUND

A typical product storage facility (e.g., a retail store, a product distribution center, a warehouse, etc.) may have hundreds of shelves and thousands of products stored on the shelves or on pallets. It is common for workers of such product storage facilities to manually (e.g., visually) inspect product display shelves and/or pallet storage areas to determine which of the products are adequately stocked (and at their proper intended locations) and which products are or will soon be out of stock and need to be replenished (or moved to their proper intended location).

Given the very large number of product storage areas such as shelves, pallets, and other product displays at product storage facilities of large retailers, and the even larger number of products stored in the product storage areas, manual inspection of the products on the shelves/pallets by the workers is very time consuming and significantly increases the operations cost for a retailer, since these workers could be performing other tasks if they were not involved in manually inspecting the product storage areas.

BRIEF DESCRIPTION OF THE DRAWINGS

Disclosed herein are embodiments of systems and methods of detecting and recognizing products at product storage areas of a retail facility. This description includes drawings, wherein.

Figure 1:
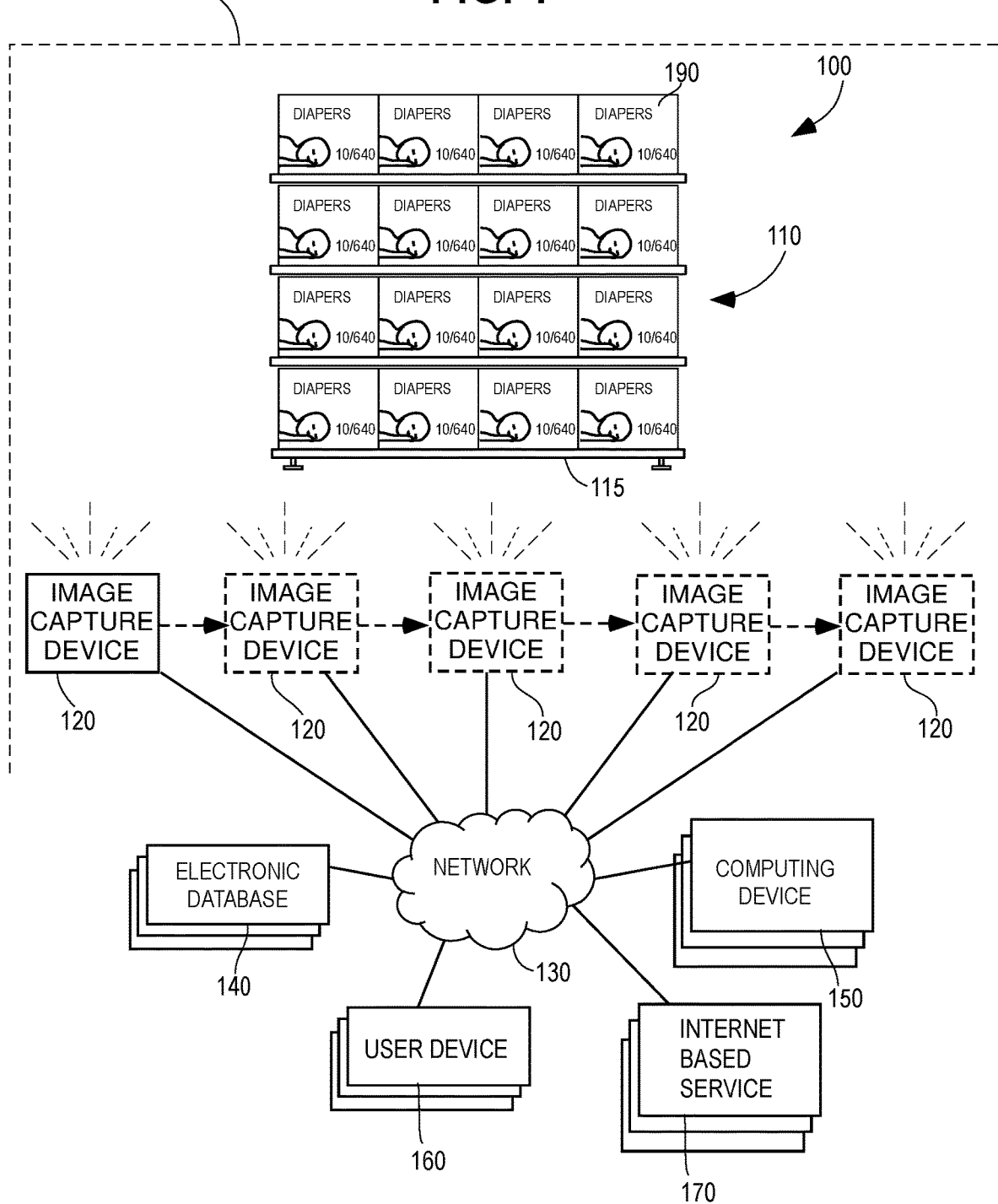
FIG. 1 is a diagram of an exemplary system of detecting and recognizing products at product storage areas of a retail facility in accordance with some embodiments, depicting a front view of a product storage area storing a group of individual products and being monitored by an image capture device.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required.

The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Systems and methods of monitoring inventory of a product storage facility include an image capture device configured to move about the product storage areas of the product storage facility and capture images of the product storage areas from various angles. A computing device coupled to the image capture device obtains the images of the product storage areas captured by the image capture device and processes the obtained images of the product storage areas to detect individual products captured in the obtained images. Based on detection of the individual products captured in the images, the computing device analyzes each of the obtained images to extract meta data from the packaging the individual products to detect one more keywords and determine the locations of the detected keywords on the packaging, and then utilizes this information to predict an identity of the products associated with the packaging.

In some embodiments, a system for detecting and recognizing products at product storage areas of a product storage facility includes an image capture device having a field of view that includes a product storage area of the product storage facility having products arranged therein, and the image capture device is configured to capture one or more images of the product storage area. The system further includes a computing device including a control circuit and being communicatively coupled to the image capture device. The control circuit of the computing device is configured to: obtain at least one image of the product storage area captured by the image capture device and analyze the at least one image of the product storage area to detect individual ones of the products captured in the at least one obtained image. In addition, the control circuit is configured to process the at least one obtained image to: extract meta data information from each of the individual ones of the products detected in the at least one obtained image; identify one or more keywords in the extracted meta data; determine a location of the one or more keywords on the individual ones of the products; and based on a determination of the location of the one or more keywords on the individual ones of the products, predict an identity of at least a first product in the at least one obtained image.

In some embodiments, a method of detecting and recognizing products at product storage areas of inventory of a product storage facility includes capturing, via an image capture device having a field of view that includes a product storage area of the product storage facility having products arranged therein, one or more images of the product storage area. The method further includes the following actions performed by a computing device including a control circuit and being communicatively coupled to the image capture device: obtaining at least one image of the product storage area captured by the image capture device; analyzing the at least one image of the product storage area to detect individual ones of the products captured in the at least one obtained image; and processing the at least one obtained image to: extract meta data information from each of the individual ones of the products detected in the at least one obtained image; identify one or more keywords in the extracted meta data; determine a location of the one or more keywords on the individual ones of the products; and based on a determination of the location of the one or more keywords on the individual ones of the products, predicting an identity of at least a first product in the at least one obtained image.

FIG. 1 shows an embodiment of a system 100 of detecting and recognizing products 190 at product storage areas 110 and on product storage structures 115 of a product storage facility 105 (which may be a retail store, a product distribution center, a warehouse, etc.). The system 100 is illustrated in FIG. 1 for simplicity with only one movable image capture device 120 that moves about one product storage area 110 containing one product storage structure 115, but it will be appreciated that, depending on the size of the product storage facility 105 being monitored, the system 100 may include multiple movable image capture devices 120 located throughout the product storage facility 105 that monitor hundreds of product storage areas 110 of and thousands of product storage structures 115. It is understood the direction and type of movement of the image capture device 120 about the product storage area 110 of the product storage facility 105 will depend on the physical arrangement of the product storage area 110 and/or the size and shape of the product storage structure 115. For example, the image capture device 120 may move linearly down an aisle alongside a product storage structure 115 (e.g., a shelving unit), or may move in a circular fashion around a table having curved or multiple sides.

Notably, the term "product storage structure" as used herein generally refers to a structure on which products 190 are stored, and may include a pallet, a shelf cabinet, a single shelf, table, rack, refrigerator, freezer, displays, bins, gondola, case, countertop, or another product display. In addition, it will be also appreciated that the product type (i.e., "Diapers") and the actual number of individual products 190 (i.e., 16) stocked on the product storage structure 115 in FIG. 1 are chosen by way of example only. Further, the size and shape of the products 190 in FIG. 1 have been shown by way of example only, and it will be appreciated that the individual products 190 may have various sizes and shapes. Notably, the term products 190 may refer to individual products 190 (some of which may be single-piece/single-component products and some of which may be multi-piece/multi-component products), as well as to packages or containers of products 190, which may be plastic- or paper-based packaging that includes multiple units of a given product 190 (e.g., a plastic wrap that includes 36 rolls of identical paper towels, a paper box that includes 10 packs of identical diapers, etc.). Alternatively, the packaging of the individual products 190 may be a plastic- or paper-based container that encloses one individual product 190 (e.g., a box of cereal, a bottle of shampoo, etc.).

The image capture device 120 (also referred to as an image capture unit) of the exemplary system 100 depicted in FIG. 1 is configured for movement about the product storage facility 105 (e.g., on the floor via a motorized or non-motorized wheel-based/track-based system locomotion system, or via slidable tracks above the floor, etc.) such that, when moving (e.g., about an aisle or other area of a product storage facility 105), the image capture device 120 has a field of view that includes at least a portion of one or more of the product storage structures 115 within a given product storage area 110 of the product storage facility 105, permitting the image capture device 120 to capture multiple images of the product storage area 110 from various viewing angles. In some embodiments, the image capture device 120 is configured as robotic device that moves without being physically operated/manipulated by a human operator (as described in more detail below). In other embodiments, the image capture device 120 is configured to be driven or manually pushed (e.g., like a cart or the like) by a human operator. In still further embodiments, the image capture device 120 may be a hand-held or a wearable device (e.g., a camera, phone, tablet, or the like) that may be carried and/or work by a worker at the product storage facility 105 while the worker moves about the product storage facility 105. In some embodiments, the image capture device 120 may be incorporated into another mobile device (e.g., a floor cleaner, floor sweeper, forklift, etc.), the primary purpose of which is independent of capturing images of product storage areas 110 of the product storage facility 105.

In some embodiments, as will be described in more detail below, the images of the product storage area 110 captured by the image capture device 120 while moving about the product storage area are transmitted by the image capture device 120 over a network 130 to an electronic database 140 and/or to a computing device 150. In some aspects, the computing device 150 (or a separate image processing internet-based/cloud-based service module) is configured to process such images as will be described in more detail below.

The exemplary system 100 includes an electronic database 140. Generally, the exemplary electronic database 140 of FIG. 1 may be configured as a single database, or a collection of multiple communicatively connected databases (e.g., digital image database, meta data database, inventory database, pricing database, customer database, vendor database, manufacturer database, etc.) and is configured to store various raw and processed images (e.g., 180, 182, and 184) of the product storage structure 115 in the product storage area 110 captured by the image capture device 120 while the image capture device 120 is moving about the product storage facility 105. In some embodiments, the electronic database 140 and the computing device 150 may be implemented as two separate physical devices located at the product storage facility 105. It will be appreciated, however, that the computing device 150 and the electronic database 140 may be implemented as a single physical device and/or may be located at different (e.g., remote) locations relative to each other and relative to the product storage facility 105. In some aspects, the electronic database 140 may be stored, for example, on non-volatile storage media (e.g., a hard drive, flash drive, or removable optical disk) internal or external to the computing device 150, or internal or external to computing devices distinct from the computing device 150. In some embodiments, the electronic database 140 may be cloud-based.

The system 100 of FIG. 1 further includes a computing device 150 (which may be one or more computing devices as pointed out below) configured to communicate with the electronic database 140 (which may be one or more databases as pointed out below), the image capture device 120, user device 160 (which may be one or more user devices as pointed out below), and/or internet-based service 170 (which may be one or more internet-based services as pointed out below) over the network 130. The exemplary network 130 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage. In some embodiments, the one or more computing devices 150, one or more electronic databases 140, one or more user devices 160, and/or portions of the network 130 are located at, or in the product storage facility 105.

The computing device 150 may be a stationary or portable electronic device, for example, a desktop computer, a laptop computer, a single server or a series of communicatively connected servers, a tablet, a mobile phone, or any other electronic device including a control circuit (i.e., control unit) that includes a programmable processor. The computing device 150 may be configured for data entry and processing as well as for communication with other devices of system 100 via the network 130. As mentioned above, the computing device 150 may be located at the same physical location as the electronic database 140, or may be located at a remote physical location relative to the electronic database 140.

Figure 2:
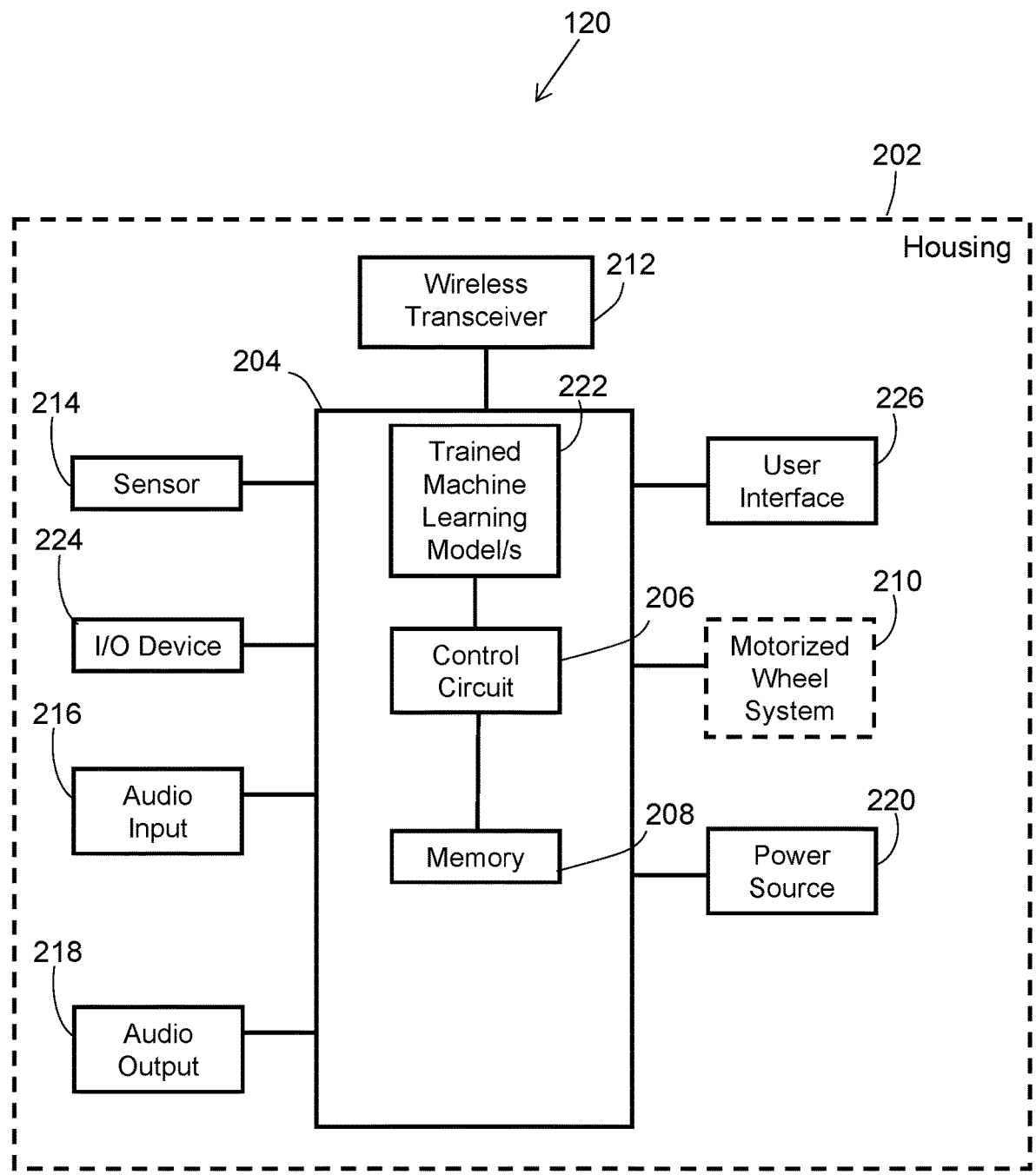
FIG. 2 comprises a block diagram of an exemplary image capture device in accordance with some embodiments.

FIG. 2 presents a more detailed example of an exemplary motorized robotic image capture device 120. As mentioned above, the image capture device 102 does not necessarily need an autonomous motorized wheel-based and/or track-based system to move about the product storage facility 105, and may instead be moved (e.g., driven, pushed, carried, worn, etc.) by a human operator, or may be movably coupled to a track system (which may be above the floor level or at the floor level) that permits the image capture device 120 to move about the product storage facility 105 while capturing images of various product storage areas 110 of the product storage facility 105. In the example shown in FIG. 2, the motorized image capture device 120 has a housing 202 that contains (partially or fully) or at least supports and carries a number of components. These components include a control unit 204 comprising a control circuit 206 that controls the general operations of the motorized image capture device 120 (notably, in some implementations, the control circuit 310 of the computing device 150 may control the general operations of the image capture device 120). Accordingly, the control unit 204 also includes a memory 208 coupled to the control circuit 206 and that stores, for example, computer program code, operating instructions and/or useful data, which when executed by the control circuit implement the operations of the image capture device.

The control circuit 206 of the exemplary motorized image capture device 120 of FIG. 2, operably couples to a motorized wheel system 210, which, as pointed out above, is optional (and for this reason represented by way of dashed lines in FIG. 2). This motorized wheel system 210 functions as a locomotion system to permit the image capture device 120 to move within the product storage facility 105 (thus, the motorized wheel system 210 may be more generically referred to as a locomotion system). Generally, this motorized wheel system 210 may include at least one drive wheel (i.e., a wheel that rotates about a horizontal axis) under power to thereby cause the image capture device 120 to move through interaction with, e.g., the floor of the product storage facility. The motorized wheel system 210 can include any number of rotating wheels and/or other alternative floor-contacting mechanisms (e.g., tracks, etc.) as may be desired and/or appropriate to the application setting.

The motorized wheel system 210 may also include a steering mechanism of choice. One simple example may comprise one or more wheels that can swivel about a vertical axis to thereby cause the moving image capture device 120 to turn as well. It should be appreciated that the motorized wheel system 210 may be any suitable motorized wheel and track system known in the art capable of permitting the image capture device 120 to move within the product storage facility 105. Further elaboration in these regards is not provided here for the sake of brevity save to note that the aforementioned control circuit 206 is configured to control the various operating states of the motorized wheel system 210 to thereby control when and how the motorized wheel system 210 operates.

In the exemplary embodiment of FIG. 2, the control circuit 206 operably couples to at least one wireless transceiver 212 that operates according to any known wireless protocol. This wireless transceiver 212 can comprise, for example, a Wi-Fi-compatible and/or Bluetooth-compatible transceiver (or any other transceiver operating according to known wireless protocols) that can wirelessly communicate with the aforementioned computing device 150 via the aforementioned network 130 of the product storage facility 105. So configured, the control circuit 206 of the image capture device 120 can provide information to the computing device 150 (via the network 130) and can receive information and/or movement instructions from the computing device 150. For example, the control circuit 206 can receive instructions from the computing device 150 via the network 130 regarding directional movement (e.g., specific predetermined routes of movement) of the image capture device 120 throughout the space of the product storage facility 105. These teachings will accommodate using any of a wide variety of wireless technologies as desired and/or as may be appropriate in a given application setting. These teachings will also accommodate employing two or more different wireless transceivers 212, if desired.

In the embodiment illustrated in FIG. 2, the control circuit 206 also couples to one or more on-board sensors 214 of the image capture device 120. These teachings will accommodate a wide variety of sensor technologies and form factors. According to some embodiments, the image capture device 120 can include one or more sensors 214 including but not limited to an optical sensor, a photo sensor, an infrared sensor, a 3-D sensor, a depth sensor, a digital camera sensor, a laser imaging, detection, and ranging (LIDAR) sensor, a mobile electronic device (e.g., a cell phone, tablet, or the like), a quick response (QR) code sensor, a radio frequency identification (RFID) sensor, a near field communication (NFC) sensor, a stock keeping unit (SKU) sensor, a barcode (e.g., electronic product code (EPC), universal product code (UPC), European article number (EAN), global trade item number (GTIN)) sensor, or the like.

By one optional approach, an audio input 216 (such as a microphone) and/or an audio output 218 (such as a speaker) can also operably couple to the control circuit 206. So configured, the control circuit 206 can provide a variety of audible sounds to thereby communicate with workers at the product storage facility 105 or other motorized image capture devices 120 moving about the product storage facility 105. These audible sounds can include any of a variety of tones and other non-verbal sounds. Such audible sounds can also include, in lieu of the foregoing or in combination therewith, pre-recorded or synthesized speech.

The audio input 216, in turn, provides a mechanism whereby, for example, a user (e.g., a worker at the product storage facility 105) provides verbal input to the control circuit 206. That verbal input can comprise, for example, instructions, inquiries, or information. So configured, a user can provide, for example, an instruction and/or query (e.g., where is pallet number so-and-so?, how many products are stocked on pallet number so-and-so? etc.) to the control circuit 206 via the audio input 216.

In the embodiment illustrated in FIG. 2, the motorized image capture device 120 includes a rechargeable power source 220 such as one or more batteries. The power provided by the rechargeable power source 220 can be made available to whichever components of the motorized image capture device 120 require electrical energy. By one approach, the motorized image capture device 120 includes a plug or other electrically conductive interface that the control circuit 206 can utilize to automatically connect to an external source of electrical energy to thereby recharge the rechargeable power source 220.

In some embodiments, the motorized image capture device 120 includes an input/output (I/O) device 224 that is coupled to the control circuit 206. The I/O device 224 allows an external device to couple to the control unit 204. The function and purpose of connecting devices will depend on the application. In some examples, devices connecting to the I/O device 224 may add functionality to the control unit 204, allow the exporting of data from the control unit 206, allow the diagnosing of the motorized image capture device 120, and so on.

In some embodiments, the motorized image capture device 120 includes a user interface 226 including for example, user inputs and/or user outputs or displays depending on the intended interaction with the user (e.g., worker at the product storage facility 105). For example, user inputs could include any input device such as buttons, knobs, switches, touch sensitive surfaces or display screens, and so on. Example user outputs include lights, display screens, and so on. The user interface 226 may work together with or separate from any user interface implemented at an optional user interface unit or user device 160 (such as a smart phone or tablet device) usable by a worker at the product storage facility 105. In some embodiments, the user interface 226 is separate from the image capture device 120, e.g., in a separate housing or device wired or wirelessly coupled to the image capture device 120. In some embodiments, the user interface 226 may be implemented in a mobile user device 160 carried by a person (e.g., worker at product storage facility 105) and configured for communication over the network 130 with the image capture device 120.

In some embodiments, the motorized image capture device 120 may be controlled by the computing device 150 or a user (e.g., by driving or pushing the image capture device 120 or sending control signals to the image capture device 120 via the user device 160) on-site at the product storage facility 105 or off-site. This is due to the architecture of some embodiments where the computing device 150 and/or user device 160 outputs the control signals to the motorized image capture device 120. These controls signals can originate at any electronic device in communication with the computing device 150 and/or motorized image capture device 120. For example, the movement signals sent to the motorized image capture device 120 may be movement instructions determined by the computing device 150; commands received at the user device 160 from a user; and commands received at the computing device 150 from a remote user not located at the product storage facility 105.

In the embodiment illustrated in FIG. 2, the control unit 204 includes a memory 208 coupled to the control circuit 206 and that stores, for example, computer program code, operating instructions and/or useful data, which when executed by the control circuit implement the operations of the image capture device. The control circuit 206 can comprise a fixed-purpose hard-wired platform or can comprise a partially or wholly programmable platform. These architectural options are well known and understood in the art and require no further description here. This control circuit 206 is configured (for example, by using corresponding programming stored in the memory 208 as will be well understood by those skilled in the art) to carry out one or more of the steps, actions, and/or functions described herein. The memory 208 may be integral to the control circuit 206 or can be physically discrete (in whole or in part) from the control circuit 206 as desired. This memory 208 can also be local with respect to the control circuit 206 (where, for example, both share a common circuit board, chassis, power supply, and/or housing) or can be partially or wholly remote with respect to the control circuit 206. This memory 208 can serve, for example, to non-transitorily store the computer instructions that, when executed by the control circuit 206, cause the control circuit 206 to behave as described herein.

In some embodiments, the control circuit 206 may be communicatively coupled to one or more trained computer vision/machine learning/neural network modules/models 222 to perform at some of the functions. For example, the control circuit 310 may be trained to process one or more images 180a-180e of product storage areas 110 at the product storage facility 105 to detect and/or recognize one or more products 190 using one or more machine learning algorithms, including but not limited to Linear Regression, Logistic Regression, Decision Tree, SVM, Naïve Bayes, kNN, K-Means, Random Forest, Dimensionality Reduction Algorithms, and Gradient Boosting Algorithms. In some embodiments, the trained machine learning module/model 222 includes a computer program code stored in a memory 208 and/or executed by the control circuit 206 to process one or more images 180a-180c, as described in more detail below.

It is noted that not all components illustrated in FIG. 2 are included in all embodiments of the motorized image capture device 120. That is, some components may be optional depending on the implementation of the motorized image capture device 120. It will be appreciated that while the image capture device 120 of FIG. 2 is a motorized robotic device capable of moving about the product storage facility while being controlled remotely (e.g., by the computing device 150) and without being controlled by an onboard human operator, in some embodiments, the image capture device 120 may be configured to permit an onboard human operator (i.e., driver) to direct the movement of the image capture device 120 about the product storage facility 105.

Figure 3:
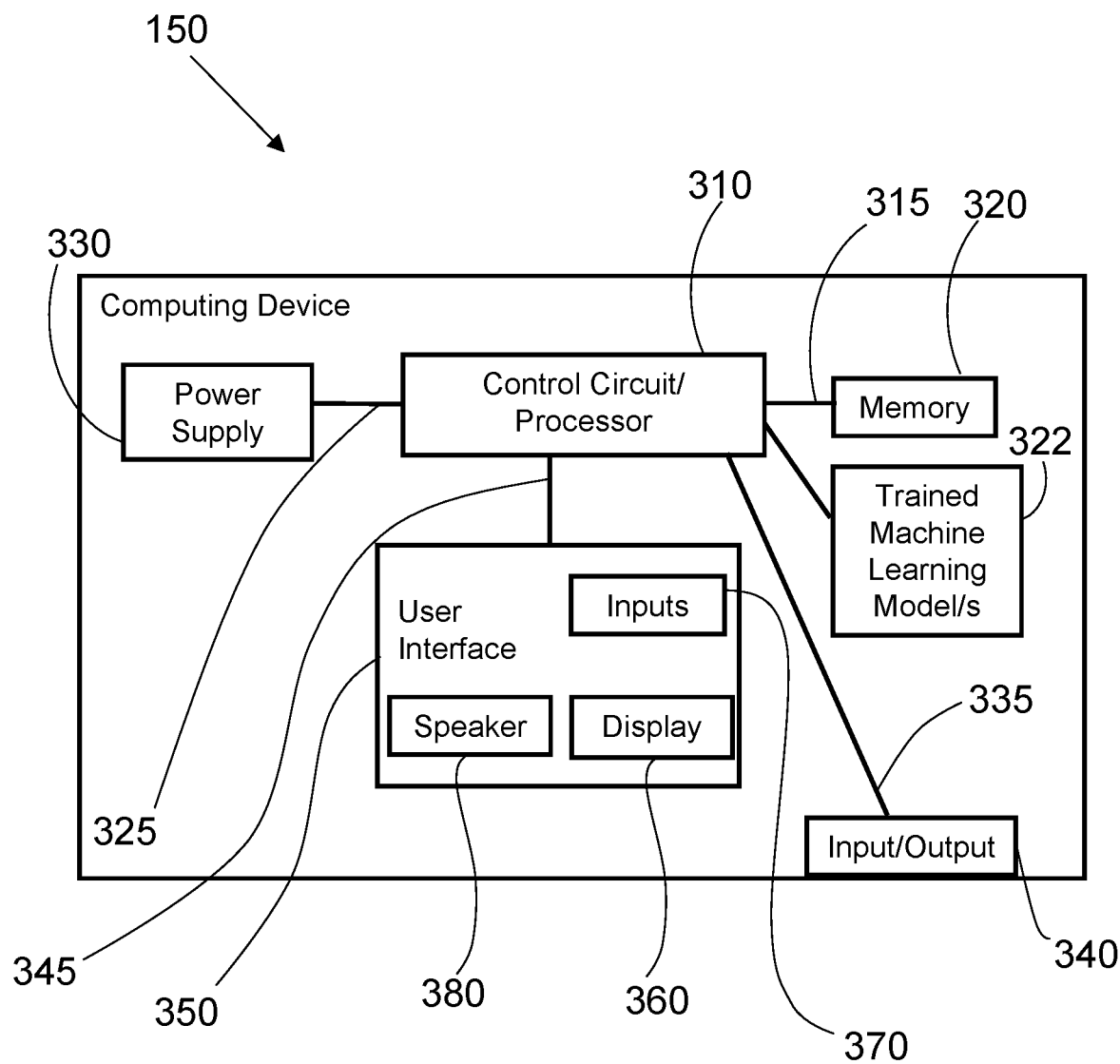
FIG. 3 is a functional block diagram of an exemplary computing device in accordance with some embodiments.

With reference to FIG. 3, the exemplary computing device 150 configured for use with exemplary systems and methods described herein may include a control circuit 310 including a programmable processor (e.g., a microprocessor or a microcontroller) electrically coupled via a connection 315 to a memory 320 and via a connection 325 to a power supply 330. The control circuit 310 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 310 can be configured (for example, by using corresponding programming stored in the memory 320 as will be well understood by those skilled in the art) to carry out one or more of the steps, actions, and/or functions described herein. In some embodiments, the memory 320 may be integral to the processor-based control circuit 310 or can be physically discrete (in whole or in part) from the control circuit 310 and is configured non-transitorily store the computer instructions that, when executed by the control circuit 310, cause the control circuit 310 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control circuit 310 of the computing device 150 is also electrically coupled via a connection 335 to an input/output 340 that can receive signals from, for example, from the image capture device 120, the electronic database 140, internet-based services 170 (e.g., one or more of an image processing service, computer vision service, neural network service, etc.), and/or from another electronic device (e.g., an electronic or user device 160 of a worker tasked with physically inspecting the product storage area 110 and/or the product storage structures 115 and observe the individual products 190 stocked thereon). The input/output 340 of the computing device 150 can also send signals to other devices, for example, a signal to the electronic database 140 including an image of a given product storage structure 115 selected by the control circuit 310 of the computing device 150 as fully showing the product storage structure 115 and each of the products 190 stored on the product storage structure 115. Also, a signal may be sent by the computing device 150 via the input-output 340 to the image capture device 120 to, for example, provide a route of movement for the image capture device 120 through the product storage facility 105.

The processor-based control circuit 310 of the computing device 150 shown in FIG. 2 is electrically coupled via a connection 345 to a user interface 350, which may include a visual display or display screen 360 (e.g., LED screen) and/or button input 370 that provide the user interface 350 with the ability to permit an operator of the computing device 150 (e.g., worker at a the product storage facility 105 (or a worker at a remote regional center) tasked with monitoring the inventory at the product storage facility 105 to manually control the computing device 150 by inputting commands via touch-screen and/or button operation and/or voice commands. Possible commands may, for example, cause the computing device 150 to cause transmission of an alert signal to electronic mobile user device/s 160 of a worker/s at the product storage facility 105 to assign a task to the worker that requires the worker to visually inspect and/or restock a given product storage structure 115 based on analysis by the computing device 150 of the image of the product storage structure 115 captured by the image capture device 120.

In some embodiments, the user interface 350 of the computing device 150 may also include a speaker 380 that provides audible feedback (e.g., alerts) to the operator of the computing device 150. It will be appreciated that the performance of such functions by the processor-based control circuit 310 of the computing device 150 is not dependent on a human operator, and that the control circuit 210 may be programmed to perform such functions without a human operator.

As pointed out above, in some embodiments, the image capture device 120 moves abut the product storage facility 105 (while being controlled remotely by the computing device 150 (or another remote device such as one or more user devices 160), or while being controlled autonomously by the control circuit 206 of the image capture device 120), or while being manually driven or pushed by a worker of the product storage facility 105. When the image capture device 120 moves about the product storage area 110 as shown in FIG. 1, the sensor 214 of the image capture device 120, which may be one or more digital cameras, captures (in sequence) multiple images of the product storage area 110 from various angles. In certain aspects, the image capture device 120 is configured to move about the product storage area 110 while capturing images of the product storage structures 115 at certain predetermined time intervals (e.g., every 1 second, 5 seconds, 10 seconds, etc.).

The images captured by the image capture device 120 may be transmitted to the electronic database 140 for storage and/or to the computing device 150 for processing by the control circuit 310 and/or to a web-/cloud-based image processing service 170. In some aspects, the control circuit 310 of the computing device 150 obtains (e.g., from the electronic database 140 or directly from the image capture device 120) an image 180 (as shown in FIG. 4) fully showing the product storage area 110, which was captured by the image capture device 120 while moving about the product storage area 110.

In particular, in some aspects, the control circuit 310 of the computing device 150 is programmed to process the image 180 (captured by the image capture device 120 and obtained by the computing device 150 from the electronic database 140 or from the image capture device 120) to extract the raw image data and meta data from the image 180. In some aspects, the image 180 may be processed via a web-/cloud-based image processing service 170, which may be installed on the computing device 150 (or communicatively coupled to the computing device 150) and executed by the control circuit 310. In certain implementations, the meta data extracted from the image 180 captured by the image capture device 120, when processed by the control circuit 310 of the computing device 150, enables the control circuit 310 of the computing device 150 to detect the physical locations and characteristics (e.g., size, shape, color, etc.) of the individual product 190 stocked on the product storage structure 115 depicted in the image 180.

Figure 4:
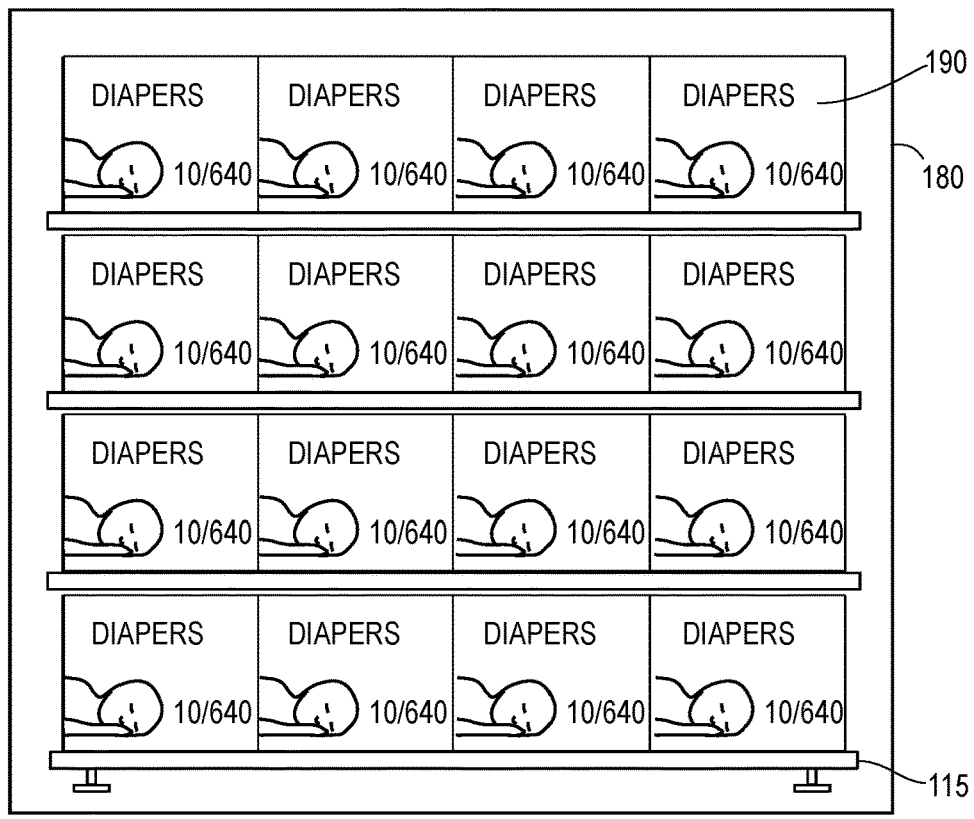
FIG. 4 is an enlarged view of a portion of an exemplary image captured by the image capture device, depicting one of the individual products stored at the product storage area of FIG. 1.

In an embodiment, the control circuit 310 of the computing device 150 is configured to process the data extracted from the image 180 of FIG. 4 to detect the overall size and shape of each of the individual products 190 located on the product storage structure 115 that appears in the image 180. For example, the control circuit 310 may be configured to process the data extracted from the image 180 and detect each of the individual products 190 in the image 180 by executing one or more machine learning and/or computer vision modules and/or trained neural network modules/models 322. In certain aspects, the neural network executed by the control circuit 310 may be a deep convolutional neural network. The neural network module/model 322 may be trained using various data sets, including, but not limited to: raw image data extracted from the image 180 of FIG. 4 (and other images) captured by the image capture device 120; meta data extracted from the image 180 captured by the image capture device 120; reference image data associated with reference images of various product storage structures 115 at the product storage facility; reference images of various products 190 stocked and/or sold at the product storage facility; and planogram data associated with the product storage facility.

In some embodiments, the control circuit 310 may be trained to process one or more images 180 of product storage areas 110 at the product storage facility 105 to detect and/or recognize one or more products 190 using one or more computer vision/machine learning algorithms, including but not limited to Linear Regression, Logistic Regression, Decision Tree, SVM, Naïve Bayes, kNN, K-Means, Random Forest, Dimensionality Reduction Algorithms, and Gradient Boosting Algorithms. In some embodiments, the trained machine learning/neural network module/model 322 includes a computer program code stored in a memory 320 and/or executed by the control circuit 310 to process one or more images 180, as described herein.

In some aspects, the control circuit 310 is configured to process the data extracted from the image 180 via computer vision and one or more trained neural networks to detect each of the individual product 190 located on the product storage structure 115 in the image 180, and to generate virtual bounding boxes or virtual boundary lines 195 (seen in image 182 in FIG. 5) around each one of the individual products 190 detected in the image 182. As seen in the image 182 in FIG. 5, the virtual boundary lines 195 extend about the outer edges of each of the detected individual products 190 and form a perimeter around each of the individual products 190. Generally, the control circuit 310 is programmed to interpret each of the virtual bounding boxes/boundary lines 195 as surrounding only one individual product 190.

Figure 5:
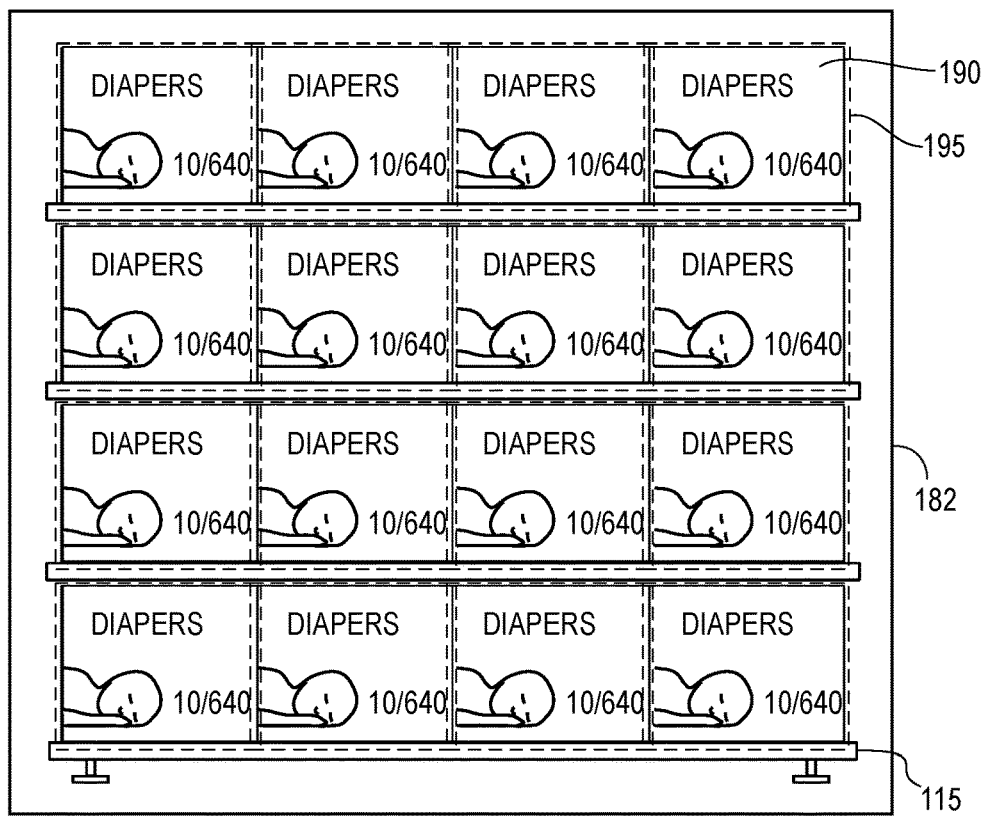
FIG. 5 is a diagram of the image of FIG. 4, after the image is processed to detect the individual products and to generate a virtual boundary line around each of the individual products detected in the image.

In some embodiments, after processing the image 180 shown in FIG. 4 to generate the virtual boundary lines 195 around the individual products 190 as shown in the image 182 of FIG. 5, the control circuit 310 of the computing device 150 is programmed to further process the image 182 (as will be described in more detail below with reference to FIGS. 6 and 7) to crop each individual product 190 from the image 182, and extract meta data information from each of the individual products 190 detected in (and cropped from) the image 182. In some aspects, the meta data information may include text/characters detected via optical character recognition (OCR), product storage facility identifier (which uniquely identifies the product storage facility 105), detection/annotation of product-surrounding bounding boxes 195 detected in the image 182, etc. As will be discussed in more detail below, in some embodiments, the control circuit 310 of the computing device 150 is programmed to process/analyze the meta data extracted from the packaging of an individual product 190 to identify one or more keywords on the packaging of the product 190 (as shown in the exemplary image 184 in FIG. 6), and determine a location of the detected keyword(s) on the packaging of the product 190, which allows the control circuit 310 to predict (with high accuracy) an identity of the product 190 in the cropped image 184.

Figure 7:
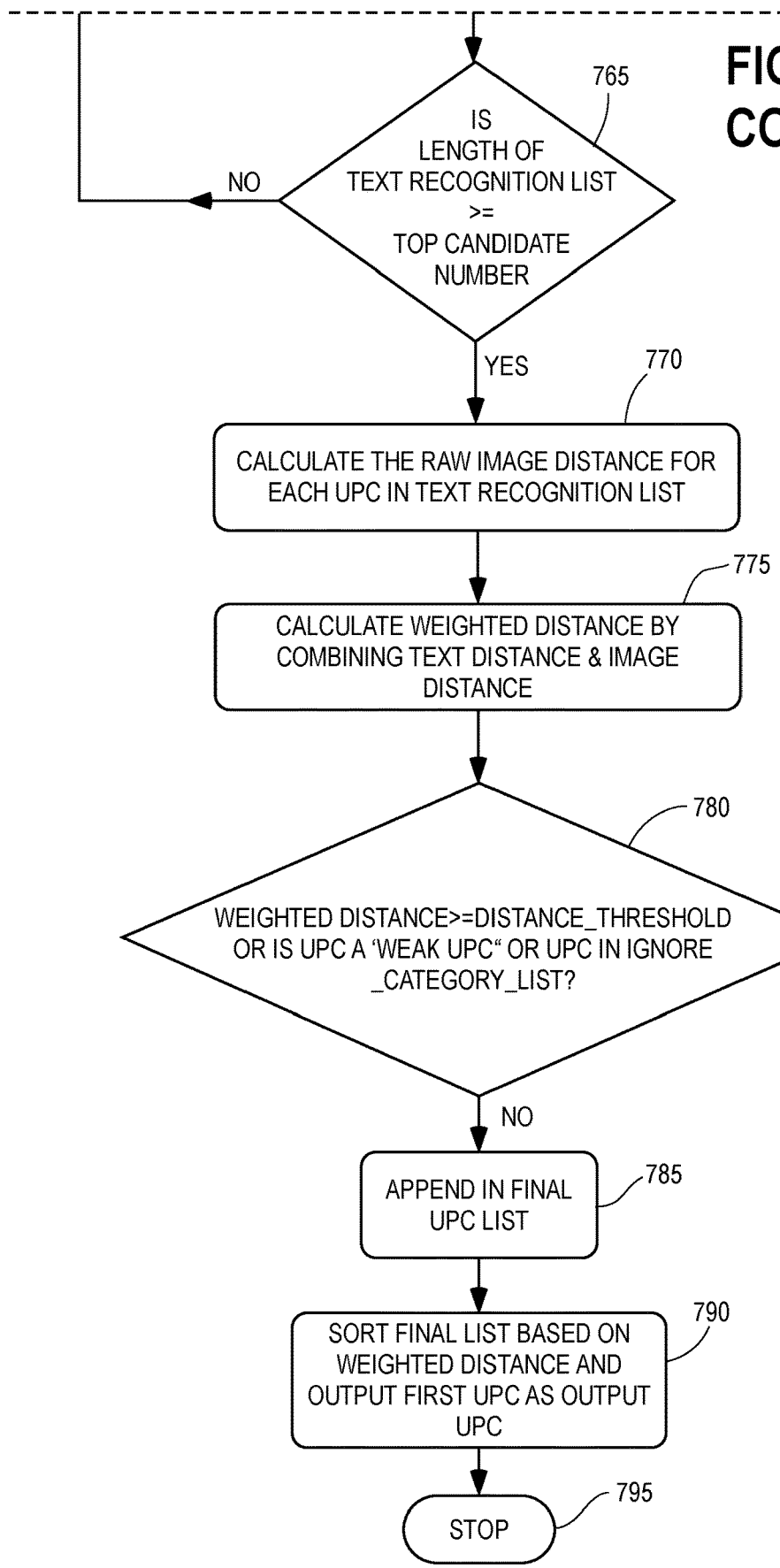
FIG. 7 is a flow diagram of an exemplary process of detecting and recognizing products at product storage areas of a retail facility in accordance with some embodiments.

FIG. 7 shows exemplary logic flow of an exemplary method 700 of detecting and recognizing products 190 at product storage areas 110 of a product storage facility 105 via processing digital images 180 of the product storage areas 110 of the product storage facility 105. The method 700 includes obtaining, by the computing device 150, an image 180 of a product storage area 110 (which, as mentioned above, may be a pallet, a shelf cabinet, a single shelf, or another product display) captured by the image capture device 120 during the movement of the image capture device 120 about the product storage facility 105 (step 705). As mentioned above, the image 180 may be transmitted by the image capture device 120 over the network 130 directly to the computing device 150, or may be obtained by the computing device over the network 130 from the electronic database 140.

In the exemplary method 700, after the computing device 150 obtains the image 180 of the product storage area 110, the control circuit 310 processes the image 180 to detect each of the individual products 190 in the image 180 and to generate an image 182 that includes virtual bounding boxes/virtual boundary lines 195 around each of the individual products 190 detected in the image 180 (step 710). Then, the control circuit 310 of the computing device 150 processes the image 182 based on the locations of the virtual bounding boxes 195 around the detected products 190 to crop each individual product 190 from the image 182, resulting in the exemplary image 184 of a single product 190 cropped from the image 182 (step 715). After the single product 190 is cropped from the image 182, the method 700 further includes the control circuit 310 extracting meta data information from the individual product 190 in the cropped image 184 (step 720). As pointed out above, the meta data information may include the text/characters detected via OCR, the product storage facility identifier, the detection/annotation of product-surrounding bounding boxes 195, etc. In some aspects, the keywords on the product 190 may be detected via the control circuit 310 executing a keyword feature vector model classification and/or machine learning and computer vision modules/model 322 that may include one or more trained neural network models.

In the exemplary method 700 of FIG. 7, after the control circuit 310 extracts the metadata and detects various keywords in the extracted OCR data, the control circuit 310 converts each of the detected keywords to keyword instances that indicate the keyword (i.e., each letter of the keyword) and the location of the keyword on the (packaging of the) product 190 (step 725). For example, in the exemplary cropped image 184 of FIG. 6, the control circuit 310 detected the word "DIAPERS" on the packaging of the product 190 and generated a virtual bounding box 197; detected the text "10/640" on the packaging of the product 190 and generated virtual bounding box 198 around this text; and detected an image of a sleeping child on the packaging of the product 190 and generated a virtual bounding box 199 around this image.

Figure 6:
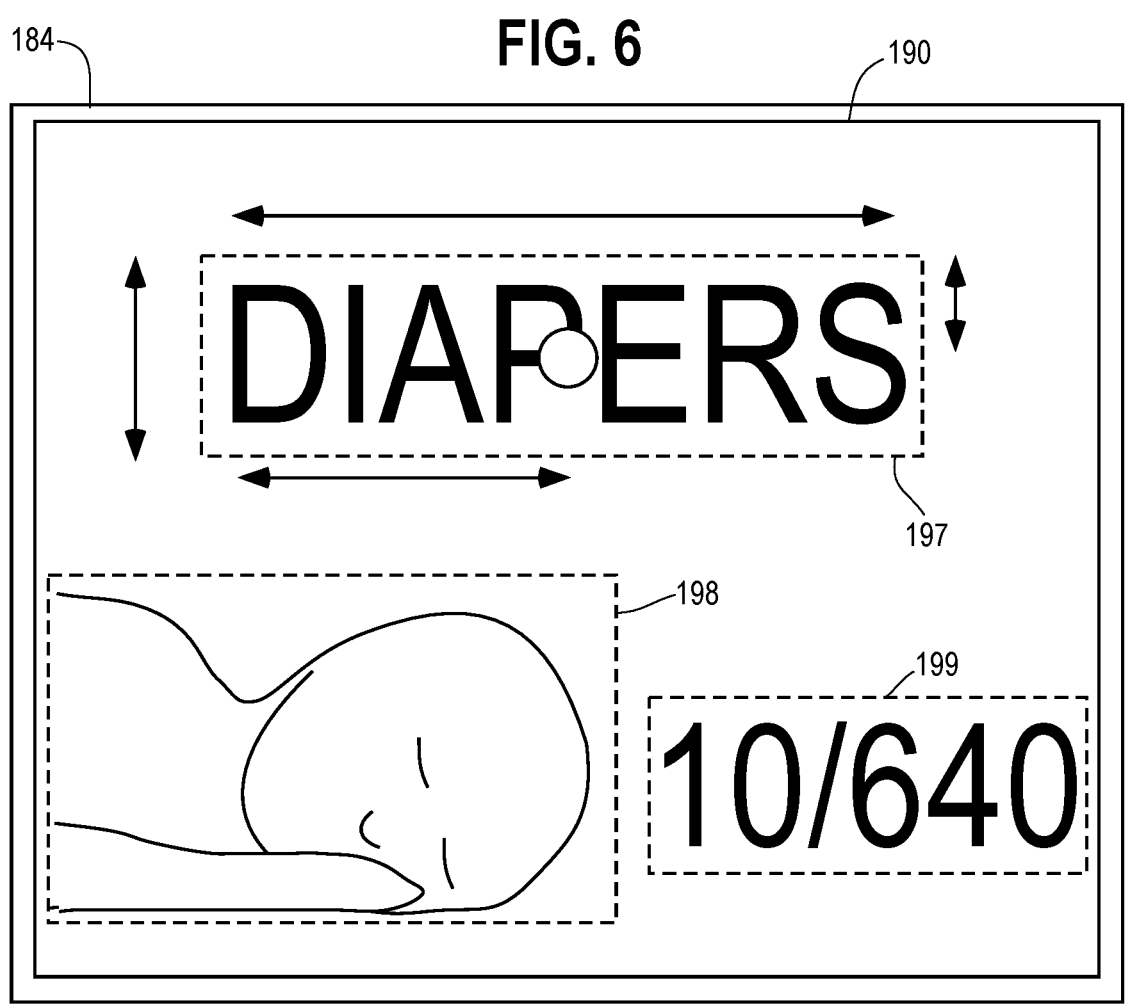
FIG. 6 is a diagram of an enlarged portion of the image of FIG. 5, after the image is processed to crop out an individual product and to perform meta data extraction and optical character recognition of the packaging of the product.

As shown in FIG. 6, in certain implementations, the virtual bounding box 197 generated by the control circuit 310 around the text (in this case, "DIAPERS") detected on the product 190 enables the control circuit 310 to determine the keyword/image width (represented by the longer horizontal arrow in FIG. 6), the keyword height (represented by the longer vertical arrow in FIG. 6), the center of the keyword along the x-axis (represented by the longer horizontal arrow in combination with the circle in FIG. 6), and the center of the keyword along the y-axis (represented by the shorter horizontal arrow in combination with the circle in FIG. 6).

After the keywords/images on the product 190 are detected and their size and location on the product 190 is ascertained by the control circuit 310, the exemplary method 700 further includes the control circuit 310 obtaining/generating a shortlist of known product identifiers of reference products associated with the one or more keywords identified on the product 190 detected in the image 180, and sorting/ranking the known product identifiers of reference products based on frequency of occurrence of the one or more keywords identified on the packaging of the product 190 on the packaging of the reference products (step 730). In one aspect, the control circuit 310 ranks the shortlisted UPC such that the UPC associated with product packaging having the largest number of keywords matching the keywords detected on the product 190 in FIG. 6 is ranked first, and the UPC associated with product packaging having the smallest number of keywords matching the keywords detected on the product 190 is ranked last.

In some embodiments, the known product identifiers of reference products are generated based on processing of images of reference products via keyword feature vector model classification and/or a web-/cloud-based services 170 and/or machine learning and computer vision modules/models 322 that may include one or more trained neural network models. In one aspect, the data representing the known product identifiers of reference products and the known keywords associated with such reference products is stored in the electronic database 140.

After the shortlist of ranked candidate UPCs is generated in step 730, the control circuit 310 is programmed to sort through the shortlist of the ranked candidate UPCs to select the UPC that is predicted by the control circuit 310 to be the closest match to the product 190 in the image 180. To that end, the method 700 of FIG. 7 further includes determining whether each of the shortlisted candidate reference UPCs is stocked (or offered for sale) at the product storage facility 105 (step 735). Step 735 may include the control circuit 310 obtaining, from the electronic database 140, electronic data representing a full list of all UPCs stocked/offered for sale at the product storage facility 105.

If the answer at step 735 is "NO" (i.e., if a certain shortlisted candidate UPCs is not stocked/offered for sale at the product storage facility 105), then the control circuit 310 skips the shortlisted UPC (step 738), eliminating this UPC from consideration, since this shortlisted UPC is not in stock and the product storage facility 105 and could not have been physically present at the product storage facility 105 when the image 180 (containing the product 190) was captured at the product storage facility 105 by the image capture device 120. On the other hand, if the answer at step 735 is "YES" (i.e., if a certain shortlisted candidate UPCs is stocked/offered for sale at the product storage facility 105), then the control circuit 310 continues the analysis of this shortlisted UPC (step 740) against the other UPCs remaining on the shortlist after step 735.

With continued reference to FIG. 7, the method 700 further includes the control circuit 310 analyzing the keywords detected on the product 190 in image 184 of FIG. 6 to determine whether any of the keywords detected on the product 190 is a negative keyword with respect to any one of the UPCs remaining on the shortlist (step 740). If the answer at step 740 is "YES," (i.e., if one of the keywords detected on the product 190 in the image 180 is not expected to be found on a product associated with one of the shortlisted UPC), the control circuit 310 marks this one of the shortlisted UPCs as a "WEAK UPC," thereby making it less likely that this UPC will present a match for the product 190 in the image 180 in FIG. 6. For example, if the product 190 relates to diapers and has an image of a child on it, but one of the shortlisted UPCs has the keyword "Adult" on it, the shortlisted UPC will be marked by the control circuit 310 as a WEAK UPC in step 742.

On the other hand, if the answer at step 740 is "NO," (i.e., if none of the keywords detected on the product 190 in the image 180 represent a negative keyword with respect to a given UPC on the shortlist), the control circuit 310 does not mark such a UPC as a WEAK UPC, and proceeds to analyze this UPC to determine whether this UPC is associated with any "must" words (i.e., distinguishing words that occur with high frequency on a given UPC) that are expected to be present on its packaging (step 745). If at step 745 the control circuit 310 determines that the answer is "YES," (i.e., that a given UPC on the shortlist is associated with certain "must" words that must appear on its packaging), the method 700 proceeds to step 747, where the control circuit 310 determines whether the "must" words associated with the shortlisted UPC have all been detected on the product 190 during the OCR processing of the product 190 in the image 180.

If at step 747 the control circuit 310 determines that the answer is "NO," (i.e., that not all of the "must" words associated with the shortlisted UPC have been detected on the product 190 during the OCR processing of the product 190 in the image 180), then the control circuit 310 reverts back to step 742 and marks this one of the shortlisted UPCs as a "WEAK UPC" to the text recognition list, making it less likely that this UPC will present a match for the product 190 in the image 180 in FIG. 4. In the exemplary method 700, if the control circuit 310 determines that the answer at step 745 is "NO," or that the answer at step 747 is "YES," the method 700 proceeds to step 750, where the control circuit 310 calculates for each template image of the shortlisted UPC a count of keywords and their locations that match the keywords and their locations detected on the product 190 during OCR analysis of the image 180. In one aspect, the control circuit 310 utilizes fuzzy matching (also referred to as approximate string matching) during step 750.

After step 750, the method 700 proceeds to step 755, where the control circuit 310 calculates, for each template image of the shortlisted UPCs, the text distance based on the matched keyword-containing areas (step 755). Then, the control circuit 310 determines if the match count is greater than or equal to the minimum (pre-determined) match count threshold and if the text distance is less than or equal to the maximum text distance threshold (step 760). If at step 760 the control circuit 310 determines that the answer to either inquiry for a given shortlisted UPC is "NO," then the control circuit 310 marks this one of the shortlisted UPCs as a "WEAK UPC," thereby making it less likely that this UPC will present a match for the product 190 in the image 180 in FIG. 4 (step 762). On the other hand, if at step 760 the control circuit 310 determines that the answer to both inquiries for a given shortlisted UPC is "YES," then the control circuit 310 marks this one of the shortlisted UPCs as a "STRONG UPC" to the text recognition list, making it more likely that this UPC will present a match for the product 190 in the image 180 in FIG. 4 (step 764).

In the exemplary method 700, for each of the shortlisted UPCs that are marked by the control circuit 310 in step 764 as a STRONG UPC on the text recognition list, the control circuit 310 determines if the length of the text recognition list is greater than or equal to the top UPC shortlist candidate number. If at step 765 the control circuit 310 determines that the answer is "NO," then the control circuit 310 reverts back to step 737 and eliminates the candidate UPC from the shortlist, thereby foreclosing the possibility that this UPC will present a match for the product 190 in the image 180 in FIG. 4.

On the other hand, if at step 765 the control circuit 310 determines that the answer for a given shortlisted UPC is "YES," then the control circuit 310 calculates the raw image distance for each UPC in the text recognition list (step 770), followed by calculating the weighted distance by combining the text distance and the image distance (step 775). Then, the control circuit 310 determines if the weighted distance is greater than or equal to the distance threshold, or if the shortlisted UPC a WEAK UPC, or if the shortlisted UPC is in an "ignore category list" (step 780). If at step 780 the control circuit 310 determines that the answer for each of the three inquiries is NO, then the control circuit adds the shortlisted UPC to the final UPC list (step 785), after which the control circuit 310 sorts the final UPC list obtained at step 785 based on the weighted distance, and outputs, at step 790, the first-ranked UPC as the output UPC (i.e., the UPC selected from the initial shortlist of the UPCs as the UPC that is predicted by the control circuit 310 to present a match for the product 190 in the image 180 captured by the image capture device 120), after which the process flow 700 stops (step 795).

In some embodiments, the control circuit 310 is programmed to execute a feature vector model (e.g., by utilizing a web-/cloud-based service 170 and/or a computer vision/machine learning/neural network module/model 322) to perform steps 770 and/or 775, which may include a determination of an exterior color of the packaging of the individual product 190 detected in the image 180. Notably, in one aspect, the control circuit 310 is programmed to predict the identity of the product 190 in the image 180 based on a determination that the exterior color of packaging associated with one of the known product identifiers on the UPC shortlist matches the exterior color determined by the control circuit 310 via the feature vector model to be associated with the product 190. For example, if the control circuit 310 determines, by utilizing the feature vector model, that the exterior color of the product 190 on the product storage structure 115 in the image 180 is blue, and that the known exterior colors of the three shortlisted UPCs 1, 2, and 3 are red, purple, and blue, respectively, then the control circuit 310 would output UPC 3 as being the final UPC predicted by the control circuit 310 to match the product 190.

In some embodiments, after outputting the UPC predicted by the control circuit 310 to present a match to the product 190 detected in the image 180, the control circuit 310 of the computing device 150 is programmed to associate meta data with the image 180 indicating that the product 190 in the image 180 is associated with the final UPC that was output at step 790 of the method 700, and to cause the computing device 150 to transmit a signal including the image 180 with this associated meta data over the network 130 to the electronic database 140 for storage.

In one aspect, this image 180 of the product 190, together with the associated meta data indicating the UPC predicted to be a match for the product 190 may be used by the control circuit 310 in subsequent image detection operations and/or training or retraining a neural network model as a reference model of the product 190 and its associated UPC. Notably, in certain aspects, the machine learning/neural network modules/models 322 may be retrained based on physical inspection of the product storage structure 115 by a worker of the product storage facility, and in response to an input received from an electronic user device 160 of the worker, for example, indicating that the UPC predicted by the control circuit 310 to be associated with the product 190 does not, upon visual inspection by the worker, actually match the identity of the product 190.

Figure 8:
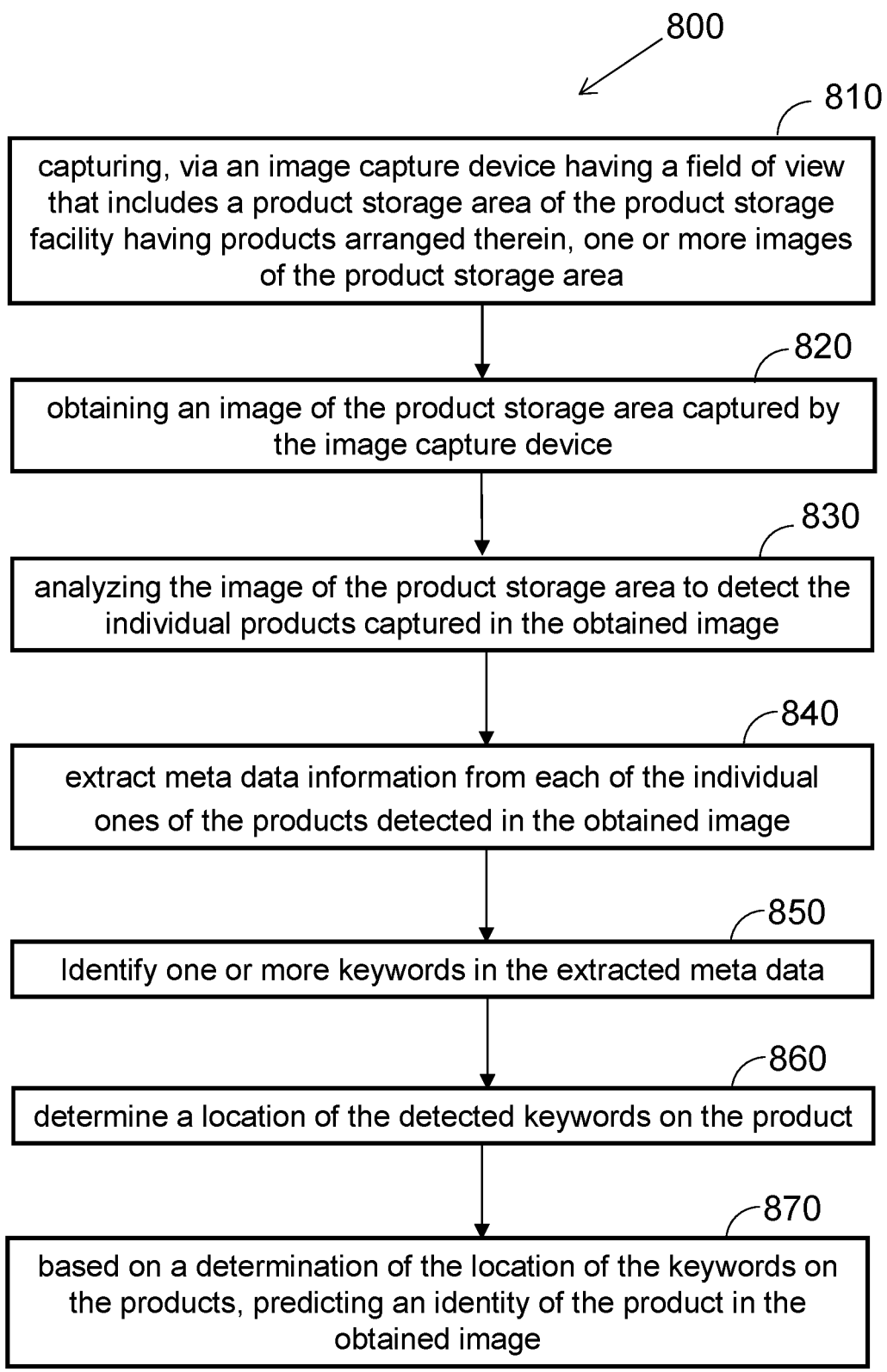
FIG. 8 is another flow diagram of an exemplary process of detecting and recognizing products at product storage areas of a retail facility in accordance with some embodiments.

With reference to FIG. 8, an exemplary method 800 of operation of the system 100 detecting and recognizing products 190 at product storage areas 110 of inventory of a product storage facility 105 is described. The method 800 includes capturing, via an image capture device 120 having a field of view that includes a product storage area 110 of the product storage facility 105 having products 190 arranged therein, one or more images 180 of the product storage area 110 (step 810). In certain aspects, step 810 may include a motorized (autonomous or human-operated) or a non-motorized human-operated image capture device 120 moving about the product storage area 110 while capturing, via a camera sensor 214 of the image capture device 120, a series of digital images that include the image 180 at predetermined intervals (e.g., 1 second, 2 seconds, 3 seconds, 5 seconds, etc.) programmed into the control circuit 206 of the image capture device 120.

The method 800 further includes several actions performed by a computing device 150 including a control circuit 310 and communicatively coupled to the image capture device 120. First, the method 800 includes obtaining an image 180 of the product storage area 110 captured by the image capture device 120 (step 820). As pointed out above, the computing device 150 may obtain the image 180 directly from the image capture device 120 (e.g., over the network 130 via the wireless transceiver 212 of the image capture device and the input/output 340 of the computing device 150), or from the electronic database 140 (e.g., over the network 130 via the input/output 340 of the computing device over the network 130).

After the image 180 is obtained by the computing device 150, the method 800 further includes analyzing the image 180 of the product storage area 110 to detect individual ones of the products 190 captured in the obtained image 180 (step 830). As pointed out above, in some aspects, the control circuit 310 processes the data extracted from the image 180 via computer vision/machine learning modules/models 322 which may include trained neural network models in order to detect each of the individual products 190 located at the product storage structure 115 depicted in the image 180, and to generate virtual boundary lines 195 (see image 182 in FIG. 5) around each one of the individual products 190 detected in the image 180.

After the images 180a-180e are analyzed/processed by the control circuit 310 of the computing device 150 to detect the individual products 190 within the image 180 and to generate virtual bounding boxes/boundary lines 195 around each of the products 190, the method 800 further includes processing the image 180 via the control circuit 310 to extract meta data information from each of the individual ones of the products 190 detected in the obtained image 180 (step 840). After the meta data associated with each of the products 190 is extracted in step 840, the method 800 further includes processing the extracted meta data by the control circuit 310 to identify/detected one or more keywords (step 850), and to determine a location of the detected keyword(s) on (the packaging of) the product 190 (step 860). Then, based on a determination of the location of the one or more keywords and/or images on the packaging of the product 190 in the image 180 (and, in some aspects, determining the exterior color of the product 190 or its packaging), the method 800 further includes predicting (with a high degree of confidence) an identity of the product 190 in the image 180 (step 870), as was described in more detail above with reference to FIG. 7.

The above described exemplary embodiments advantageously provide for inventory management systems and methods, where the individual products stocked on product storage structures at product storage facilities of a retailer can be detected and identified by processing images obtained from an image capture device that moves about the product storage facilities and captures images of product storage areas of the product storage facilities. As such, the systems and methods described herein provide for an efficient and precise detection and recognition of on-hand product inventory at a product storage facility and provide a significant cost savings to the product storage facility by saving the product storage facility thousands of worker hours that would be normally spent on manual on-hand product availability monitoring.

This application is related to the following applications, each of which is incorporated herein by reference in its entirety: entitled SYSTEMS AND METHODS OF SELECTING AN IMAGE FROM A GROUP OF IMAGES OF A RETAIL PRODUCT STORAGE AREA filed on Oct. 11, 2022, application Ser. No. 17/963,787; entitled CLUSTERING OF ITEMS WITH HETEROGENEOUS DATA POINTS filed on Oct. 11, 2022, application Ser. No. 17/963,903; and entitled SYSTEMS AND METHODS OF TRANSFORMING IMAGE DATA TO PRODUCT STORAGE FACILITY LOCATION INFORMATION filed on Oct. 11, 2022, application Ser. No. 17/963,751.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for detecting and recognizing products at product storage areas of a product storage facility, the system comprising:
   an image capture device having a field of view that includes a product storage area of the product storage facility having products arranged therein, wherein the image capture device is configured to capture one or more images of the product storage area;
   a computing device including a control circuit, the computing device being communicatively coupled to the image capture device, the control circuit being configured to:
   obtain at least one image of the product storage area captured by the image capture device;
   analyze the at least one image of the product storage area to detect individual ones of the products captured in the at least one obtained image;
   process the at least one obtained image to:
   extract meta data information from each of the individual ones of the products detected in the at least one obtained image;
   identify one or more keywords in the extracted meta data information;
   determine a location of the one or more keywords on the individual ones of the products; and
   based on a determination of the location of the one or more keywords on the individual ones of the products, predict an identity of at least a first product in the at least one obtained image.

2. The system of claim 1, wherein the image capture device comprises a motorized robotic unit that includes wheels that permit the motorized robotic unit to move about the product storage facility, and a camera to permit the motorized robotic unit to capture the one or more images of the product storage area.

3. The system of claim 1, wherein the control circuit is programmed to generate virtual boundary lines in the at least one obtained image, wherein each of the virtual boundary lines surrounds one of the products captured in the at least one obtained image.

4. The system of claim 1, wherein the control circuit is programmed to extract optical character recognition information as part of the meta data information extracted from each of the individual ones of the products detected in the at least one obtained image.

5. The system of claim 4, wherein the control circuit is programmed to analyze the optical character recognition information to determine:
   a height and width of the one or more keywords identified on the individual ones of the products; and
   horizontal and vertical coordinates of the one or more keywords with respect to a height of the individual ones of the products.

6. The system of claim 5, wherein the control circuit is programmed to generate a list of known product identifiers associated with the one or more keywords identified on the individual ones of the products, the known product identifiers being ranked on the list based on frequency of occurrence of the one or more keywords identified on the individual ones of the products.

7. The system of claim 6, wherein the control circuit is programmed to correlate images of products associated with the known product identifiers on the list to the at least one image captured by the image capture device via a feature vector model configured to identify an exterior color of packaging of each of the individual ones of the products captured in the at least one obtained image.

8. The system of claim 7, wherein the control circuit is programmed to predict the identity of at least a first product in the at least one obtained image based on a determination that the exterior color of the packaging associated with one of the known product identifiers on the list matches the exterior color of the packaging of one of the individual ones of the products in the at least one image captured by the image capture device.

9. The system of claim 8, further comprising an electronic database configured to store the one or more images captured by the image capture device, and store the images of products associated with the known product identifiers, the electronic database being communicatively coupled to at least one of the image capture device and the computing device.

10. The system of claim 9, wherein the control circuit is programmed to, after making a prediction of the identity of the first product to send a signal to the electronic database to cause the first product in the at least one image captured by the image capture device to be associated with a product identifier corresponding to one of the known product identifiers of the packaging that matched the exterior color of the packaging of the first product.

11. A method of detecting and recognizing products at product storage areas of a product storage facility, the method comprising:
    capturing, via an image capture device having a field of view that includes a product storage area of the product storage facility having products arranged therein, one or more images of the product storage area;
    by a computing device including a control circuit and being communicatively coupled to the image capture device:
        obtaining at least one image of the product storage area captured by the image capture device;
        analyzing the at least one image of the product storage area to detect individual ones of the products captured in the at least one obtained image;
        processing the at least one obtained image to:
        extract meta data information from each of the individual ones of the products detected in the at least one obtained image;
        identify one or more keywords in the extracted meta data information;
        determine a location of the one or more keywords on the individual ones of the products; and
    based on a determination of the location of the one or more keywords on the individual ones of the products, predicting an identity of at least a first product in the at least one obtained image.

12. The method of claim 11, wherein the image capture device comprises a motorized robotic unit that includes wheels that permit the motorized robotic unit to move about the product storage facility, and a camera to permit the motorized robotic unit to capture the one or more images of the product storage area.

13. The method of claim 11, further comprising, by the control circuit, generating virtual boundary lines in the at least one obtained image, wherein each of the virtual boundary lines surrounds one of the products captured in the at least one obtained image.

14. The method of claim 11, further comprising, by the control circuit, extracting optical character recognition information as part of the meta data information extracted from each of the individual ones of the products detected in the at least one obtained image.

15. The method of claim 14, further comprising, by the control circuit, analyzing the optical character recognition information to determine:
    a height and width of the one or more keywords identified on the individual ones of the products; and
    horizontal and vertical coordinates of the one or more keywords with respect to a height of the individual ones of the products.

16. The method of claim 15, further comprising, by the control circuit, generating a list of known product identifiers associated with the one or more keywords identified on the individual ones of the products, the known product identifiers being ranked on the list based on frequency of occurrence of the one or more keywords identified on the individual ones of the products.

17. The method of claim 16, further comprising, by the control circuit, correlating images of products associated with the known product identifiers on the list to the at least one image captured by the image capture device via a feature vector model configured to identify an exterior color of packaging of each of the individual ones of the products captured in the at least one obtained image.

18. The method of claim 17, further comprising, by the control circuit, wherein the control circuit, predicting the identity of at least a first product in the at least one obtained image based on a determination that the exterior color of the packaging associated with one of the known product identifiers on the list matches the exterior color of the packaging of one of the individual ones of the products in the at least one image captured by the image capture device.

19. The method of claim 18, further comprising providing an electronic database configured to store the one or more images captured by the image capture device, and store the images of products associated with the known product identifiers, the electronic database being communicatively coupled to at least one of the image capture device and the computing device.

20. The method of claim 19, further comprising, by the control circuit, after making a prediction of the identity of the first product, sending a signal to the electronic database to cause the first product in the at least one image captured by the image capture device to be associated with a product identifier corresponding to one of the known product identifiers of the packaging that matched the exterior color of the packaging of the first product.

* * * * *